US008009401B2

(12) United States Patent
Domejean et al.

(10) Patent No.: US 8,009,401 B2
(45) Date of Patent: Aug. 30, 2011

(54) VOLTAGE SURGE PROTECTION DEVICE COMPRISING SELECTIVE DISCONNECTION MEANS

(75) Inventors: Eric Domejean, Voreppe (FR); Christophe Grumel, Lans en Vercors (FR); Christophe Chabert, Polienas (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 416 days.

(21) Appl. No.: 12/379,272

(22) Filed: Feb. 18, 2009

(65) Prior Publication Data

US 2009/0213518 A1 Aug. 27, 2009

(30) Foreign Application Priority Data

Feb. 27, 2008 (FR) ..................................... 08 01072

(51) Int. Cl.
*H02H 1/00* (2006.01)

(52) U.S. Cl. ......................... 361/124; 337/191; 337/278

(58) Field of Classification Search .................. 361/124; 337/191, 278

See application file for complete search history.

(56) References Cited

U.S. PATENT DOCUMENTS

| | | | | |
|---|---|---|---|---|
| 2,156,058 | A * | 4/1939 | Lohausen | 337/229 |
| 3,194,923 | A * | 7/1965 | Cameron et al. | 337/161 |
| 7,352,552 | B2 | 4/2008 | Domejean et al. | 361/118 |
| 2005/0280971 | A1 | 12/2005 | Domejean et al. | 361/111 |

FOREIGN PATENT DOCUMENTS

| | | |
|---|---|---|
| EP | 0 441 722 | 11/1994 |
| EP | 1 953 788 | 8/2008 |

* cited by examiner

*Primary Examiner* — Rexford Barnie
*Assistant Examiner* — Tien Mai
(74) *Attorney, Agent, or Firm* — Steptoe & Johnson LLP

(57) ABSTRACT

A voltage surge protection device comprising a disconnection device with electric contacts said disconnection device comprising a first connecting electrode electrically connected with a first connecting strip, a second connecting electrode electrically connected with a second connecting strip, and a third switching electrode electrically connected to the second connecting strip. The protection device comprises a surge arrestor connected in series with a thermal disconnector between the third movable arc switching electrode and the second connecting strip. Said thermal disconnector comprises at least one fuse element extending between a first and second conducting radial wall of an arc extinguishing chamber, said arc extinguishing chamber comprising at least one conducting separator.

20 Claims, 7 Drawing Sheets

Fig. 4A
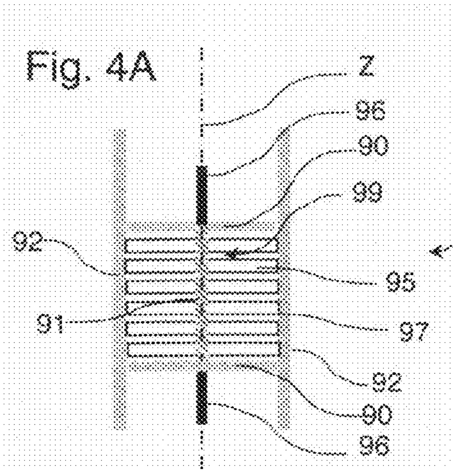
Fig. 4B
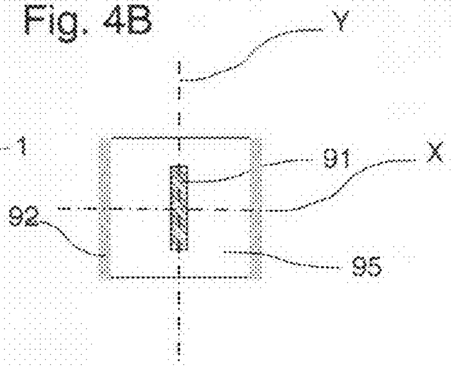
Fig. 5A
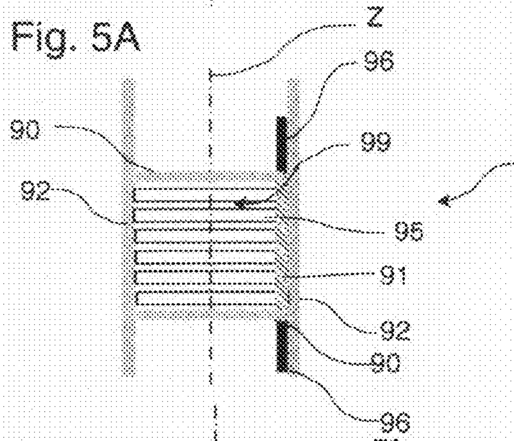
Fig. 5B
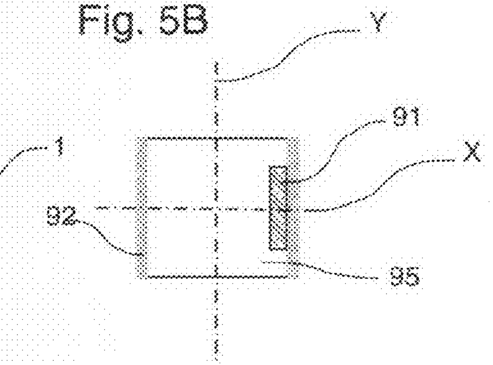
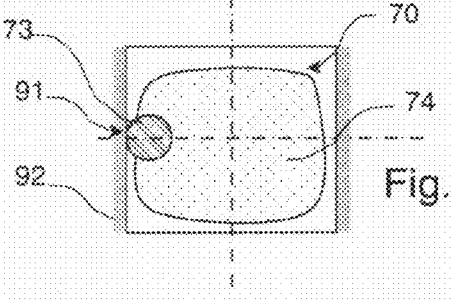
Fig. 6A
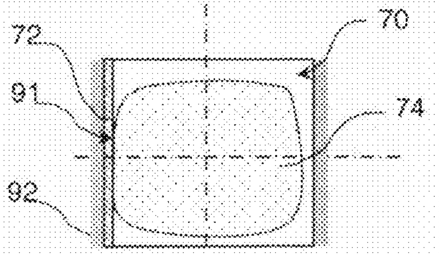
Fig. 6B
Fig. 6C
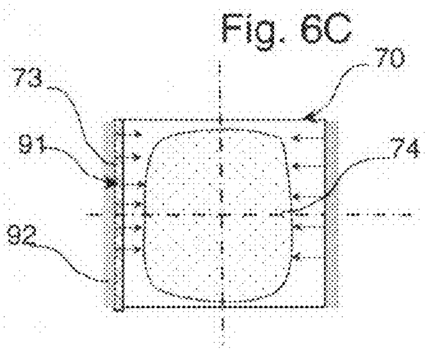

VOLTAGE SURGE PROTECTION DEVICE COMPRISING SELECTIVE DISCONNECTION MEANS

BACKGROUND OF THE INVENTION

The invention relates to a voltage surge protection device comprising a disconnection device with electric contacts. Said disconnection device comprises a first connecting electrode electrically connected with a first connecting strip, a second connecting electrode electrically connected with a second connecting strip, a third movable arc switching electrode electrically connected to the second connecting strip, and a surge arrestor connected in series between the third movable arc switching electrode and the second connecting strip. An actuating mechanism is designed to move the third movable arc switching electrode to cause permanent opening of the electric contacts.

STATE OF THE PRIOR ART

Voltage surge protection devices are known comprising a surge arrestor with non-linear elements variable with the voltage and a disconnection device with contacts actuated by an actuating mechanism. The surge arrestor and disconnection device are connected in series.

As described in the document EP0441722B1, the disconnection device with contacts can take a break position and a make position respectively corresponding to the open state and closed state of the contacts. An actuating mechanism causes movement of the contacts of the disconnection device to the open state in particular in case of destruction of the surge arrestor when said non-linear elements are at the end of life.

The disconnection device with contacts is calibrated:

on the one hand to discharge electric surge currents of 10/350 or 8/20 type without the actuating mechanism being actuated, and on the other hand to actuate the actuating mechanism and to automatically cause permanent opening of the contacts for AC or DC short-circuit currents.

The contacts can generally open (repel) and reclose under a lightning surge without the actuating mechanism unlatching. This repulsion (opening) of the contacts during operation of the protection device is followed by automatic reclosing of said contacts.

What is meant by "permanent opening" of the contacts is opening caused by the actuating mechanism. This actuation can be brought about manually or be due to an electrical fault. In the case of manual opening, reclosing of the contacts then only being possible by deliberate external action by a user. In the case of opening due to an electrical fault, opening is then definitive.

Calibration of known protection devices is performed in such a way that the disconnection device actuating mechanism remains latched in the presence of electric surge currents of 10/350 or 8/20 type. It is generally not desirable for the disconnection device actuating mechanism to unlatch and cause permanent opening of the contacts each time an electric surge current flows through the latter.

The tripping energy threshold is directly dependent on electric surge currents of 10/350 or 8/20 type for which opening of the disconnection device contacts is not desirable. In other words, said tripping energy threshold corresponds to the threshold above which electric surge currents of 10/350 or 8/20 type would bring about permanent opening of the electric contacts.

Furthermore, AC or DC short-circuit currents having an electric energy greater than the tripping energy threshold cause opening of the disconnection device contacts.

For electric surge currents of 10/350 or 8/20 type having an electric energy lower than the tripping energy threshold, the protection device is efficacious and enables said electric surge currents to be discharged without their energy being responsible for material damage. Moreover, electric surge currents of 10/350 or 8/20 type having an electric energy lower than the tripping energy threshold do not unlatch the disconnection device actuating mechanism to bring about opening of the contacts.

However, under certain particular circumstances, known protection devices do not present a sufficient protection level.

Indeed, when the AC or DC short-circuit energy drops below that of the tripping threshold energy, the actuating mechanism is no longer actuated and does not cause permanent movement of the disconnection device contacts from closed state to open state. The risk of deterioration of components is then not negligible This situation can in particular occur when:

the impedance of the surge arrestor becomes weak after receiving numerous voltage surges. An AC short-circuit current having an energy that is lower than that of the tripping threshold then flows in the protection device.

the protection device is incorrectly installed. In particular when a protection device, usually connected between a phase and neutral, is connected for example between two phases. The voltage applied between the phases is generally greater than the voltage that the surge arrestor can withstand continuously. The surge arrestor then turns on and an AC short-circuit current flows in the protection device. This weak short-circuit AC current can be reduced if the power of the supply transformer is weak and/or when the cables are of great length.

In the two situations described above, the short-circuit current having a lower energy than that of the tripping energy threshold can cause material damage.

SUMMARY OF THE INVENTION

The object of the invention is therefore to remedy the shortcomings of the state of the art so as to propose a voltage surge protection device comprising efficient disconnection means for protection against short-circuits.

The voltage surge protection device according to the invention comprises at least a first thermal disconnector against AC or DC short-circuit currents connected in series with the surge arrestor between the third movable arc switching electrode and the second connecting strip. Said thermal disconnector comprises at least one fuse element extending through a passage gap between a first and second conducting radial wall inside an insulating side wall extending from an arc extinguishing chamber, said arc extinguishing chamber comprising at least one conducting separator secured inside the side wall to define two pressure relief volumes. Said thermal disconnector is out of circuit when an electric arc is switched between the first connecting electrode and the second connecting electrode. Disconnection of said disconnector is performed when AC or DC short-circuit electric currents having a lower energy than a tripping energy threshold is flowing through the latter, said tripping energy threshold corresponding to the threshold above which electric surge currents of 10/350 or 8/20 type bring about permanent opening of the electric contacts.

The fuse element preferably comprises a cross-section of substantially identical shape to the cross-section of the passage gap.

The cross-section of said at least one fuse element in a plane perpendicular to a longitudinal centre line is preferably of elongate shape so that the length of said cross-section is at least three times larger than the width thereof.

Advantageously, the thermal disconnector comprises two arc extinguishing chambers respectively having a fuse element passing there-through.

Advantageously, said at least one conducting fuse element is composed of a conducting metal foil.

Advantageously, the metal foil is secured by securing means on an insulating support constituting an element of the insulating side wall.

Preferably, said at least one conducting fuse element is placed on the edges of said at least one separator.

Advantageously, the side wall comprises holes for removing the gases contained in the pressure relief volumes.

Advantageously, the protection device comprises a case having at least two flange-plates made of insulating material, said flange-plates forming part of the side wall of the thermal disconnector.

Advantageously, the insulating side wall is composed of a gas-generating material.

According to a first particular embodiment of the invention, the surge arrestor is electrically connected in series with the disconnection device by at least one fuse link, drive means exert a movement force moving the surge arrestor in case said at least one fuse link melts, movement of said arrestor acting directly on the actuating mechanism to move the third movable arc switching electrode and cause permanent opening of the contacts.

Preferably, the surge arrestor is electrically connected to the second connecting strip by a first fuse link that melts in the event of overheating of said surge arrestor.

Preferably, the surge arrestor is electrically connected to the second connecting strip by a second fuse link acting as thermal disconnector.

According to a second particular embodiment of the invention, a second electromagnetic disconnector against AC or DC short-circuit currents is connected in series with the thermal disconnector and the surge arrestor between the third movable arc switching electrode and the second connecting strip.

Preferably, the electromagnetic disconnector comprises electromagnetic tripping means designed to act on the actuating mechanism to cause permanent opening of the electric contacts.

According to a mode of development, a high-energy disconnector is connected in series between the first connecting electrode and the first connecting strip, the high-energy disconnector being calibrated to disconnect when electric currents having a greater energy than the tripping energy threshold flow through the latter.

Advantageously, the high-energy disconnector comprises an arc extinguishing chamber being delineated by an insulating side wall extending between a first and second conducting radial wall, the arc extinguishing chamber comprising at least one conducting separator secured inside said chamber to define two pressure relief volumes and at least one conducting fuse element electrically connected between a first and second electrode, said at least one fuse element extending from the first to the second radial wall via a gap and being rigidly secured in the arc extinguishing chamber by securing means, the cross-section of said at least one fuse element being of elongate shape so that the length of said cross-section is at least three times larger than its width.

According to a mode of development, a closing stop is designed to directly or indirectly keep the third movable arc switching electrode at a separation distance from the first connecting electrode when the electric contacts are closed.

Preferably, the closing stop comprises two parts: a first part made of insulating material placed in contact with the stationary contact and a second part made of conducting material placed adjacently to the first part and in contact with the movable contact when the two contacts are closed.

Advantageously, the thickness of the insulating first part is equal to the separation distance.

BRIEF DESCRIPTION OF THE DRAWINGS

Other advantages and features will become more clearly apparent from the following description of particular embodiments of the invention, given as non-restrictive examples only and represented in the accompanying drawings in which:

FIGS. 4A and 4B represent schematic views of a thermal disconnector according to a first embodiment of the invention;

FIGS. 5A and 5B represent schematic views of a thermal disconnector according to a second embodiment of the invention;

FIG. 6A represents a schematic cross-sectional view of an electric arc in a known arc extinguishing chamber;

FIGS. 6B and 6C represent schematic cross-sectional views of an electric arc in an arc extinguishing chamber of a thermal disconnector according to the embodiments represented in FIGS. 1 to 3;

DETAILED DESCRIPTION OF AN EMBODIMENT

Figure 1:
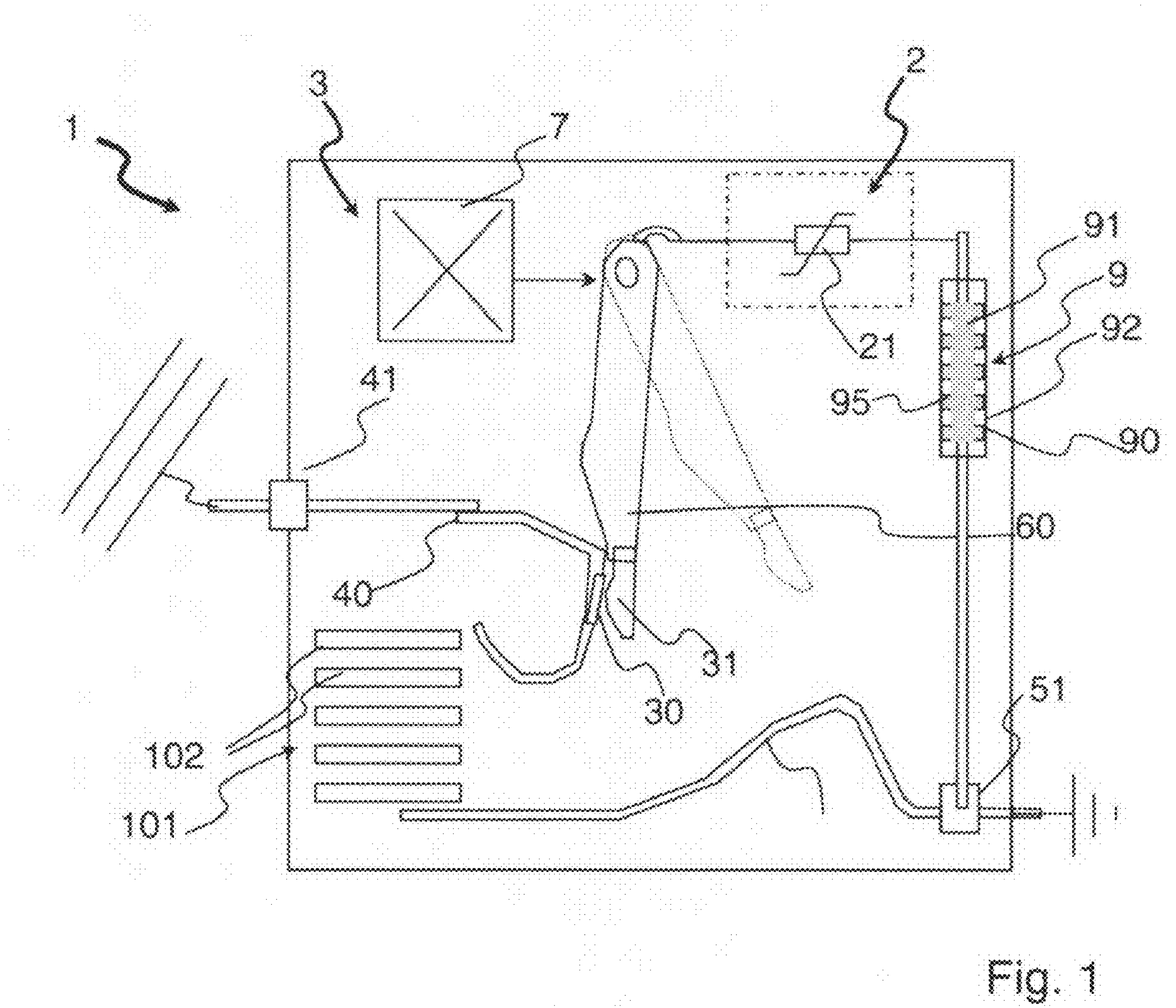
FIGS. 1 to 3 represent schematic views of a voltage surge protection device according to a preferred embodiment of the invention.
Figure 2:
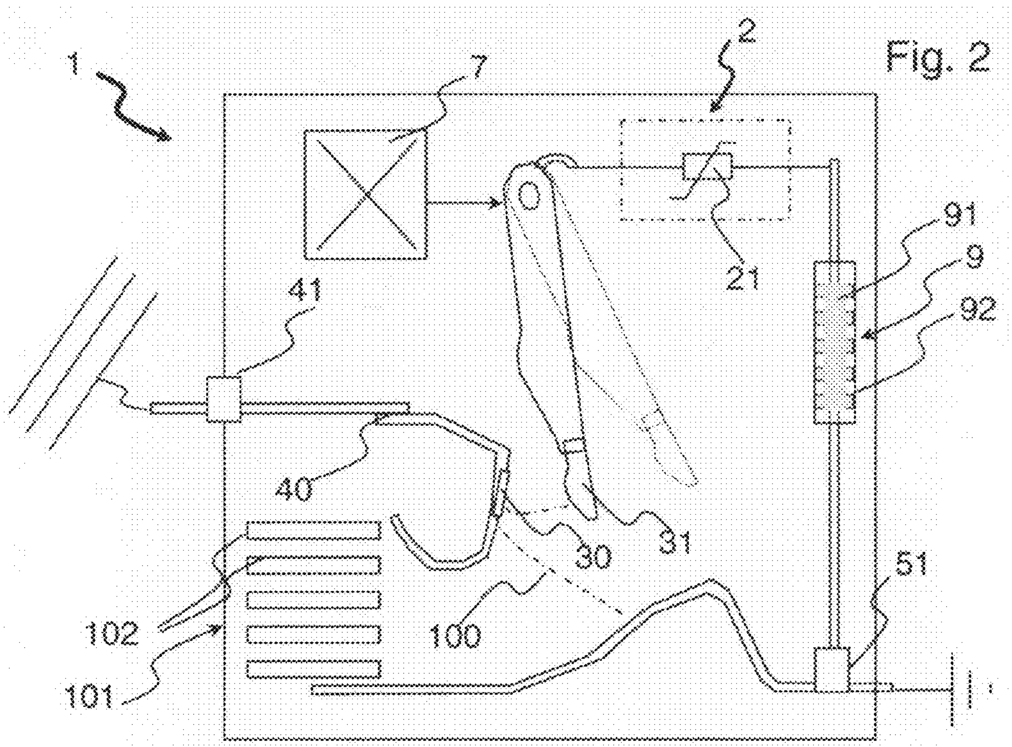
Figure 3:
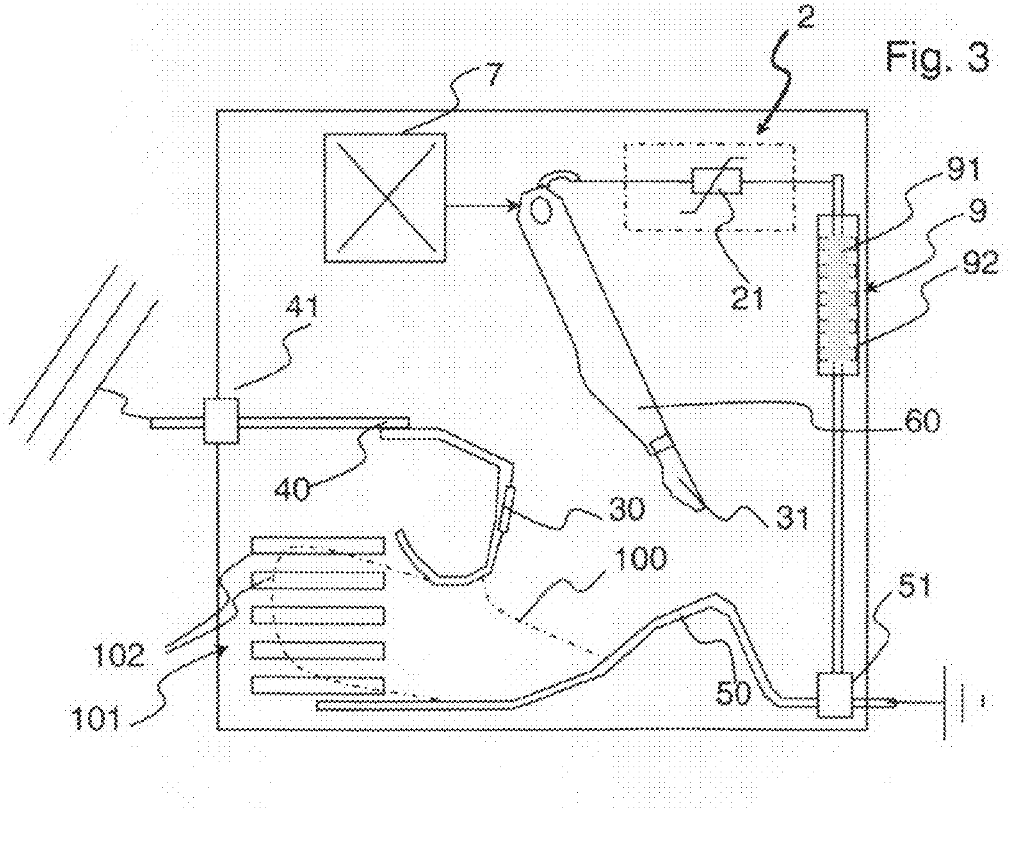

As represented in FIGS. 1 to 3, voltage surge protection device 1 comprises a surge arrestor 2 with non-linear elements variable with the voltage and a disconnection device 3 with electric contacts 30, 31. Surge arrestor 2 and disconnection device 3 are electrically connected in series.

Surge arrestor 2 preferably comprises a voltage-dependent resistor 21. In certain non-represented embodiments of the invention, a spark gap can also be fitted in series with voltage-dependent resistor 21.

Disconnection device 3 comprises a first connecting electrode 40 electrically connected with a first connecting strip 41 and a second connecting electrode 50 electrically connected with a second connecting strip 51.

If protection device 1 is connected between phase and earth, connecting strips 41, 51, are designed to be respectively connected to a phase and to earth or vice-versa.

Disconnection device 3 comprises a third movable arc switching electrode 60 electrically connected to second connecting strip 51.

A first electric contact 30 is placed on first connecting electrode 40 and a second electric contact 31 is positioned on third movable arc switching electrode 60.

As represented in FIGS. 1 to 3, according to a preferred embodiment, surge arrestor 2 is connected in series between third movable arc switching electrode 60 and second connecting strip 51.

Third movable arc switching electrode 60 is in contact with first connecting electrode 40 when electric contacts 30, 31 are closed.

Disconnection device 3 further comprises an actuating mechanism 7. Said mechanism is designed to be actuated to move third movable arc switching electrode 60 and mechanically bring about permanent opening of electric contacts 30, 31.

Disconnection device 3 with contacts 30, 31 is calibrated on the one hand to discharge electric surge currents of 10/350 or 8/20 type without actuating mechanism 7 being actuated, and on the other hand to actuate actuating mechanism 7 and cause permanent opening of contacts 30, 31 for AC or DC short-circuit currents.

Calibration of protection devices 1 is performed such that actuating mechanism 7 of disconnection device 3 remains latched in the presence of electric surge currents of 10/350 or 8/20 type. Actuating mechanism 7 does not in fact cause permanent opening of the contacts each time an electric surge current flows through the latter.

The tripping energy threshold is directly dependent on electric surge currents of 10/350 or 8/20 type for which opening of contacts 30, 31 of disconnection device 3 is not performed. In other words, said tripping energy threshold corresponds to the threshold above which electric surge currents of 10/350 or 8/20 type would cause permanent opening of electric contacts 30, 31.

When electric currents having a higher energy than a tripping energy threshold flow in the protection device, actuating mechanism 7 is actuated and moves third movable arc switching electrode 60 and mechanically causes permanent opening of electric contacts 30, 31. The electric currents responsible for actuation of actuating mechanism 7 are generally AC or DC short-circuit currents.

When electric surge currents of 10/350 or 8/20 type having a lower energy than the tripping energy threshold flow in the protection device, the protection device is efficacious and enables electric surge currents to be discharged without their energy being responsible for material damage. Furthermore, said electric surge currents do not unlatch disconnection device actuating mechanism 7 to cause opening of contacts 30, 31.

The surge voltage protection device comprises at least a first disconnector against AC or DC short-circuit currents 9, 10. Said at least first disconnector is a thermal disconnector 9.

As represented in FIGS. 1 to 3, according to the embodiment modes, thermal disconnector 9 is electrically connected in series with surge arrestor 2 between third movable arc switching electrode 60 and second connecting strip 51.

When electric surge currents of 10/350 or 8/20 type flow in the protection device, an arc electric 100 is very quickly switched between first connecting electrode 40 and second connecting electrode 50. Surge arrestor 2 and thermal disconnector 9 are then simultaneously switched out of circuit and the voltage surge flows very little in the latter. Said arrestor and said thermal disconnector are thereby protected and are not damaged by surges. The protection device comprises an extinguishing chamber 101 of the electric arc 100. First connecting electrode 40 and second connecting electrode 50 are arranged facing arc extinguishing chamber 101 and delineate the mouth of said arc extinguishing chamber 101. Said arc extinguishing chamber 101 comprises deionizing fins 102 designed for cooling an electric arc 100 and for extinguishing the latter.

As represented in FIGS. 5A to 6B, according to a first preferred embodiment, thermal disconnector 9 comprises at least one fuse element 91 extending through a passage gap inside an insulating side wall 92 of an arc extinguishing chamber 99. Arc extinguishing chamber 99 comprises a longitudinal centre line Z. Insulating side wall 92 of arc extinguishing chamber 99 extends between conducting first and second radial walls 90. Arc extinguishing chamber 99 comprises at least one conducting separator 95 secured inside insulating side wall 92 to define two pressure relief volumes 97. Said at least one separator is positioned between the two conducting radial walls 90. First and second radial walls 90 preferably extend perpendicularly to the longitudinal geometric centre line Z of said extinguishing chamber.

The cross-section of said at least one fuse element 91 in a plane perpendicular to the longitudinal centre line Z is of elongate shape. Moreover, said cross-section is substantially identical to that of the passage gap. The length of said cross-section is preferably at least three times larger than the width thereof.

Fuse element 91 extends from first to second radial wall 90 through passage gap and is rigidly secured in arc extinguishing chamber 99 by securing means. Said securing means guarantee rigid securing of said at least one fuse element 91 in case of a lightning strike. They enable the electrodynamic forces due to lightning strikes to be withstood.

Advantageously, as represented in FIGS. 5A, 5B, fuse element 91 is placed on the periphery of said at least one separator 95. Fuse element 91 is rigidly secured between said at least one separator 95 and said at least one insulating side wall 92. The clearance between fuse element 91 and each of separators 95 is minimal in order in particular to guarantee rigid securing of the fuse element in case of a lightning strike. Separators 95 and insulating wall 92 then act directly as securing means.

Conducting fuse element 91 is preferably composed of a metal conducting foil. The conducting foil is preferably secured by securing means onto an insulating support able to form an element of insulating side wall 92.

When fuse element 91 melts, an electric arc arises at the level of the passage gap. Due to the elongate shape of said passage gap, said electric arc, which naturally has a cross-section of substantially circular shape, is forced to deform and leave said gap zone. Development of the arc in pressure relief volumes 97 is thereby fostered enabling a sufficient arcing voltage to be reached for satisfactory limiting of short-circuit currents. Furthermore, said arc tends to be laminated inside said passage gap. This lamination of the electric arc in the passage gap tends to raise its voltage rapidly for satisfactory limiting of the short-circuit currents.

As illustrated in FIGS. 6B to 6C, the passage gap of said at least one fuse element is represented by a first hatched zone 73. The dotted surface 74 represents the electric arc present in the pressure relief spaces 97 when said at least one fuse element has melted. The electric current has then reached a significant value, greater than 1000 A. The zone where dotted surface 74 and first hatched zone 73 overlap corresponds to the space where a fraction of the electric arc is not divided by the separators. The larger this overlapping zone, the weaker the arcing voltage and the lower short-circuit current limiting will be. A high arcing voltage will thus be reached more rapidly with breaking devices according to the invention than with known breaking devices. The interaction zone between dotted zone 74 and hatched zone 73 is in fact smaller for FIG. 6B than for FIG. 6A.

As represented in FIGS. 4A to 5B, arc extinguishing chamber 99 comprises several conducting separators 95 preferably extending perpendicularly to longitudinal centre line Z.

Said at least one side wall 92 is preferably composed of four side plates extending in a longitudinal centre line Z. The four side plates are joined to one another. Arc extinguishing chamber 99 has the shape of a parallelepiped and separators 95 have a square or rectangular shape. Surge protection device 1 comprises a case made of molded plastic material formed by two parallel side flange-plates made of insulating material placed on each side of a longitudinal centre line. Said flange-plates can form a part of two plates of side wall 92. A part of the side flange-plates then constitutes a part of side wall 92 of arc extinguishing chamber 99 of thermal disconnector 9. Separators 95 are secured by two of the side flange-plates.

According to an alternative embodiment, side wall 92 is preferably made from gas-generating plastic material. As represented in FIG. 6C, the presence of gas-generating material enables the electric arc to be repelled to the centre of the arc extinguishing chamber moving this arc away from the passage gap. As described above, this enables the efficiency of the fuse disconnecting device arc extinguishing chamber to be further increased.

Furthermore, in certain non-represented applications, the insulating side wall can be made from glass or ceramic.

According to an alternative embodiment, said at least one side wall 92 comprises holes for removal of the gases contained in pressure relief volumes 97.

According to another alternative embodiment, filters are placed at the level of the gas removal holes, preferably outside the arc extinguishing chambers. These filters enable external manifestations of the protection device to be greatly limited. Indeed, the hot breaking gases present in the arc extinguishing chamber are greatly cooled at the moment the latter pass through the filters. The inside of the surge protection device is thereby less polluted.

Figure 7:
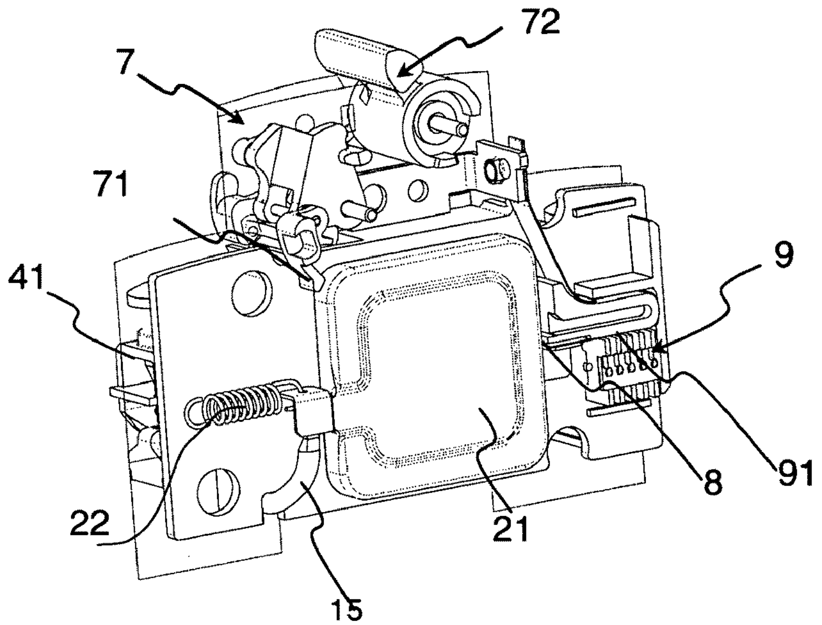
FIGS. 7 to 9 represent schematic views of a voltage surge protection device according to a particular embodiment of the invention according to FIG. 1, in different operating positions.
Figure 8:
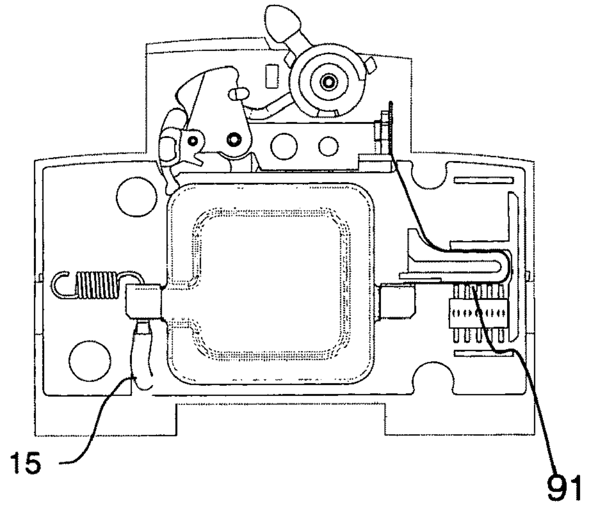
Figure 9:
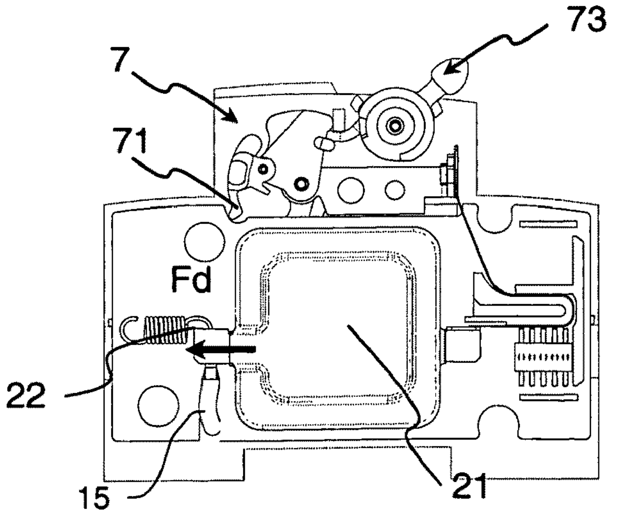

According to a first particular mode of development of the preferred embodiment, surge arrestor 2 is electrically connected in series with disconnection device 3 by at least one fuse link 8, 91. As represented in FIGS. 7 to 9, drive means 22 continuously exert a displacement force Fd on said surge arrestor. If at least one of fuse links 8, 91 is destroyed, surge arrestor 2 then moves due to the action of displacement force Fd. Displacement of said surge arrestor acts directly on actuating mechanism 7. Said mechanism unlatches and moves third movable arc switching electrode 60, and brings about permanent and definitive opening of electric contacts 30, 31.

Drive means 22 preferably comprise a spring. According to the particular embodiment as represented in FIGS. 7 to 9, this spring of helical type is stretched to exert displacement force Fd directly on voltage-dependent resistor 21 of surge arrestor 2. According to another particular embodiment, not represented, this spring of helical type is compressed.

Surge arrestor 2 can be electrically connected to second connecting strip 51 by two fuse links 8, 91. For example, a first fuse link 8 is subject to melting in the event of overheating of said surge arrestor. A second fuse link 91 acts as thermal disconnector 9. When at least one of fuse links 8, 91 melts, voltage-dependent resistor 21 moves due to the action of displacement force Fd to act directly on actuating mechanism 7. As represented in FIGS. 7 to 9, voltage-dependent resistor 21 is connected in series with disconnection device 3 via two terminals. A first terminal is connected to disconnection device 3 by a flexible metal braid 15, and a second terminal is connected to second connecting strip 51.

The conducting metal foil constitutes fuse element 91 of thermal disconnector 9. The conducting metal foil thus secures the voltage-dependent resistor in a first position. The conducting metal foil connecting voltage-dependent resistor 21 to second connecting strip 51 then comprises a cross-section that is calibrated to melt when electric short-circuit currents whose energy is lower than the tripping threshold flow through said foil for a given time. Furthermore, the conducting metal foil connecting voltage-dependent resistor 21 to second connecting strip 51 is welded to the second terminal of the voltage-dependent resistor by a low-temperature weld forming first fuse link 8.

Operation remains unchanged if voltage-dependent resistor 21 is placed in a carriage or in a movable case forming a single block with voltage-dependent resistor 21. The displacement force Fd could then be applied on the carriage or on the movable case instead of being applied directly on the voltage-dependent resistor. The carriage or movable case could furthermore act directly on trip bar 71 of actuating mechanism 7.

Figure 10:
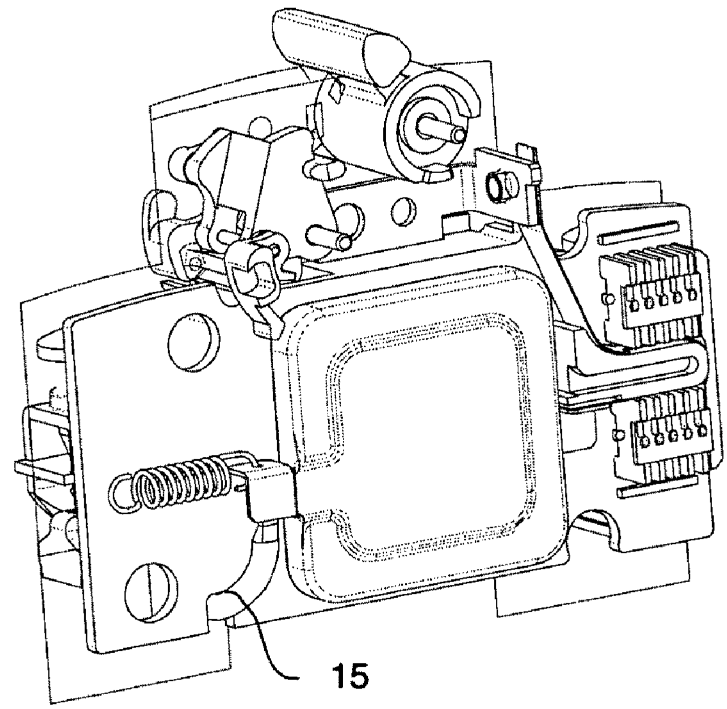
FIG. 10 represents an alternative embodiment of the protection device according to FIGS. 7 to 9.

According to an alternative embodiment as represented in FIG. 10, thermal disconnector 9 comprises two arc extinguishing chambers 99 placed side by side. A fuse element 91 passes through each arc extinguishing chamber 99. This particular arrangement of the two arc extinguishing chambers 99 is optimized for an internal volume of a surge protection device as represented in FIG. 10.

Moreover, fitting two arc extinguishing chambers 99 connected in series enables the arcing voltage to be doubled and short-circuit currents to thereby be better limited. Fuse elements 91 respectively passing through the two arc extinguishing chambers 99 are not calibrated in identical manner. First fuse element 91 which is directly connected to voltage-dependent resistor 21 via metal foil is in fact calibrated to melt before the second fuse element. This configuration ensures that in the presence of short-circuit current, melting of the first fuse element will systematically release said voltage-dependent resistor. The voltage-dependent resistor will move due to the effect of displacement force Fd to actuate actuating mechanism 7 and bring about permanent and definitive opening of electric contacts 30, 31.

Figure 11:
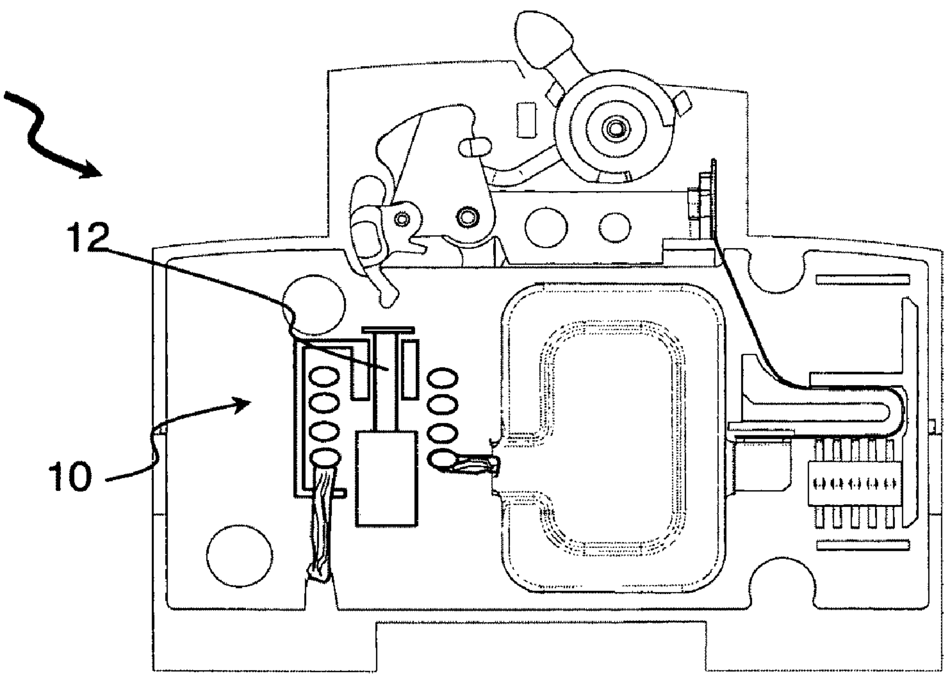
FIG. 11 represents a schematic view of a second particular embodiment of the protection device according to FIG. 1.

As represented in FIG. 11, according to a second particular mode of development of the preferred embodiment, a second disconnector protecting against AC or DC short-circuit currents 10 is connected in series with surge arrestor 2 between third movable arc switching electrode 60 and second connecting strip 51. The second disconnector is an electromagnetic disconnector 10. Electromagnetic disconnector 10 comprises electromagnetic trip means 12 to act on actuating mechanism 7 and cause permanent opening of electric contacts 30, 31. According to a first embodiment example, electromagnetic trip means 12 comprise a plunger core. Flow of short-circuit currents through electromagnetic disconnector 10 results in the plunger core moving to act on actuating mechanism 7. This plunger core in fact comprises a striker which releases the latching of actuating mechanism 7. The mass of the plunger core is calibrated such that the core does not move when lightning surge currents flow in the protection device. This electromagnetic disconnector 10 with plunger core preferably also comprises its own latching system to prevent resetting of actuating mechanism 7 when the latter is unlatched. According to a second embodiment example, electromagnetic trip means 12 comprise a blade. As in the previous example, the mass of the blade is calibrated such that said blade does not move when lightning surge currents flow in the protection device. This blade preferably also has a latching system which prevents resetting of actuating mechanism 7 when the blade has been actuated by a fault current. Electromagnetic disconnector 10 is also calibrated to actuate actuating mechanism 7 when AC or DC short-circuit electric currents whose energy is greater than the tripping disconnection threshold flow in the latter. Electromagnetic trip means 12 act on actuating mechanism 7 to bring about permanent and definitive opening of electric contacts 30, 31.

Operation of surge protection device 1 comprising at least a first thermal disconnector 9 is as follows:

When electric surge currents of 10/350 or 8/20 type flow in the protection device, an arc electric 100 is very quickly switched between first connecting electrode 40 and second connecting electrode 50. Thermal disconnector 9 is disconnected from the circuit and the lightning shock wave no longer flows through the latter. Thermal disconnector 9 is then protected and is not damaged by lightning strikes.

Due to the fact that said disconnector is very seldom subjected to lightning strikes, calibration thereof is essentially dependent on the energy of the short-circuit currents for which it is designed to disconnect.

When AC or DC short-circuit currents having a lower energy than the tripping energy threshold flow through surge protection device 1, said currents flow through first connecting electrode 40, third connecting electrode 60 and thermal disconnector protecting against AC or DC short-circuit currents 9, 10. Repulsion of movable contact 31 is then limited. The arcing voltage between contacts 30, 31 remains weak and switching of arc 100 is not possible or takes place very late. What is meant by weak arcing voltage is a voltage lower than the power system voltage, for example less than 100 Volts.

Thermal disconnector 9 is nevertheless calibrated to disconnect when AC or DC short-circuit electric currents whose energy is greater than a disconnection threshold flow through the latter. For example, the electric currents responsible for disconnection of said disconnector have an intensity of more than 100 A.

Fuse element 91 of thermal disconnector 9 is calibrated to then switch from a closed electric state to an open electric state due to the effect of the thermal stress generated by flow of the short-circuit currents. The voltage generated by arc extinguishing chamber 99 of thermal disconnector 9 is great due to fractioning in the separators 95 and/or lamination of the arc. For these short-circuit current values, limitation will therefore essentially be performed by thermal disconnector 9. Furthermore, melting of fuse element 91 leads to displacement of surge arrestor 2 and actuation of actuating mechanism 7 to bring about permanent and definitive opening of electric contacts 30, 31.

When strong AC or DC short-circuit currents having a greater intensity than that of those described above, in particular having an intensity of more than 6000 A, flow through voltage surge protection device 1, repulsion of third movable arc switching electrode 60 is considerable. Arcing voltage 100 increases rapidly and switching of the latter onto second connecting electrode 50 takes place quickly. This speed of switching depends on the level of the short-circuit current. After switching, increase of the arcing voltage is ensured by arc extinguishing chamber 101. In spite of this high-speed opening of electric contacts 30, 31, a residual current can flow in third movable arc switching electrode 60 and eventually lead to melting of fuse element 91 of thermal disconnector 9 or actuation of electro-magnetic disconnector 10. Said melting or said actuation then results in movement of surge arrestor 2 and actuation of actuating mechanism 7 to cause permanent and definitive opening of electric contacts 30, 31.

Figure 12A:
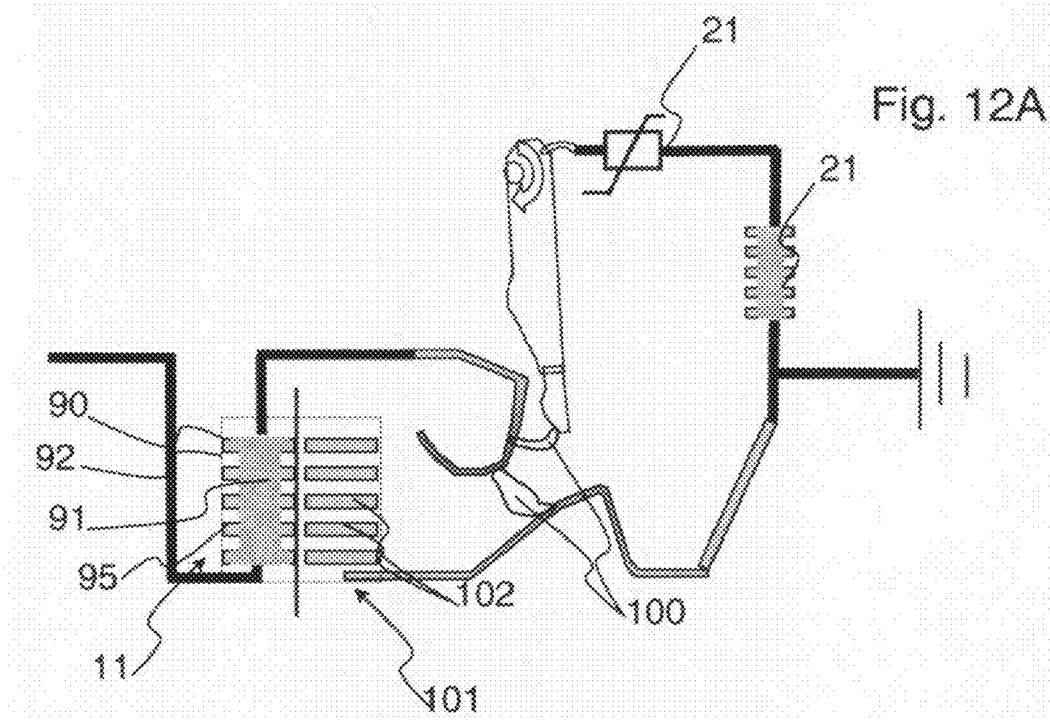
FIGS. 12A and 12B represent schematic views of alternative embodiments of the protection device according to the different embodiments of the invention.
Figure 12B:
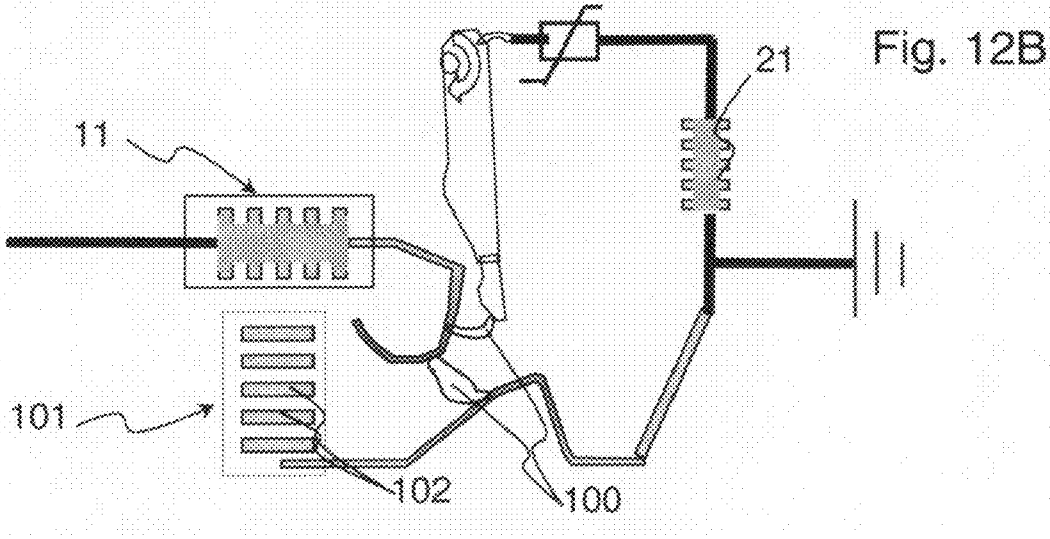

According to first alternative embodiments, a high-energy disconnector 11 is connected in series between first connecting electrode 40 and first connecting strip 41. Said high-energy disconnector 11 is calibrated to disconnect when electric currents having a greater energy than the tripping energy threshold flow through the latter. Said high-energy disconnector is preferably designed to act on actuating mechanism 7 to move third movable arc switching electrode 60 and cause permanent opening of electric contacts 30, 31. High-energy disconnector 11 is then calibrated to unlatch actuating mechanism 7 when electric currents having a greater energy than the tripping energy threshold flow through same. Said high-energy disconnector then comprises means for acting on actuating mechanism 7 to bring about permanent opening of electric contacts 30, 31. As an example embodiment, high-energy disconnector 11 is an electromagnetic disconnector comprising electromagnetic trip means. As represented in FIGS. 12A and 12B as an example embodiment, high-energy disconnector 11 is a thermal disconnector. Said disconnector comprises an arc extinguishing chamber 99 having a longitudinal centre line Z and being delineated by an insulating side wall 92. Said wall extends between a first and second conducting radial wall 90. Arc extinguishing chamber 99 comprises at least one conducting separator 95 secured inside said chamber to define two pressure relief volumes 97. At least one fuse element 91 is electrically connected between a first and second electrode 96 and extending from first to second radial wall 90 via a passage gap. Said at least one fuse element 91 is rigidly secured in arc extinguishing chamber 99 by securing means. The cross-section of said at least one fuse element 91 in a plane perpendicular to longitudinal centre line Z is of elongate shape so that the length of said cross-section is at least three times greater than the width. Thus, although limiting is essentially performed by arc extinguishing chamber 101, said arc extinguishing chamber 101 does not enable a sufficient arcing voltage to be reached for satisfactory limiting of short-circuit currents. The arcing voltage complement is then conveyed by arc extinguishing chamber 99 of high-energy thermal disconnector 11. Addition of these two voltages then enables the current to be limited very rapidly.

Figure 13:
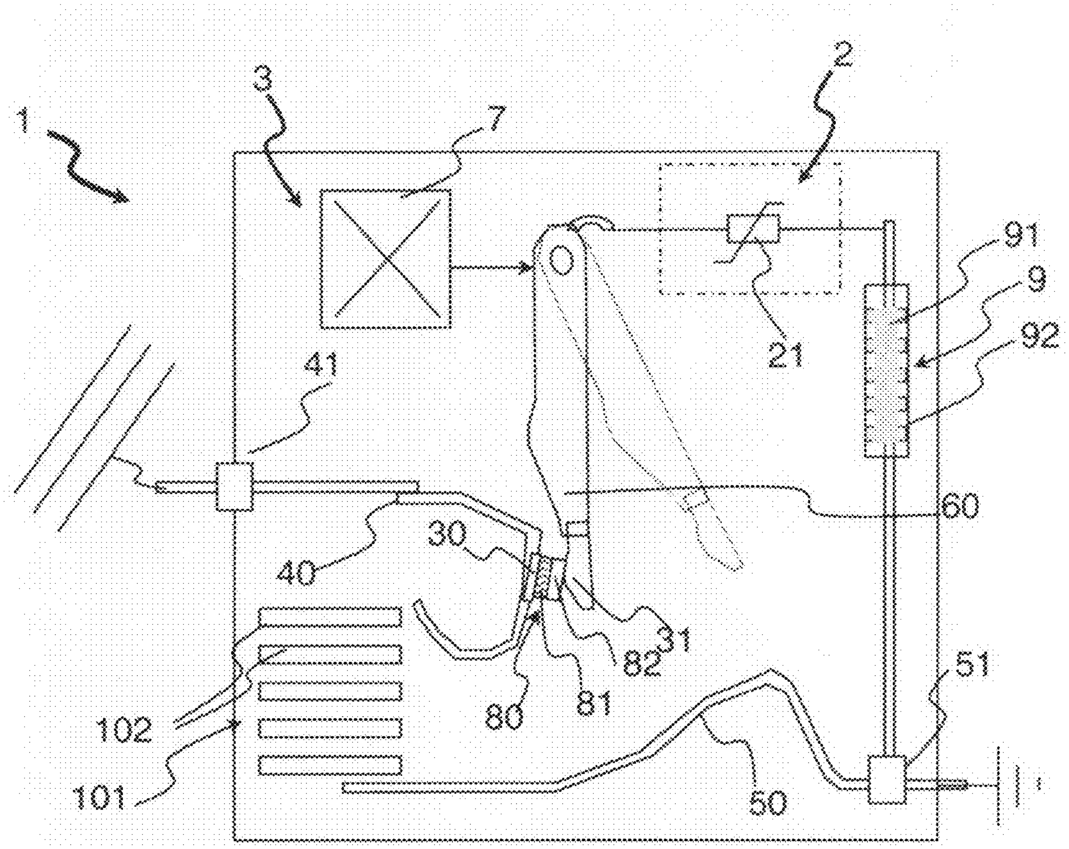
FIG. 13 represents a schematic view of another alternative embodiment of the voltage surge protection device.

According to a second alternative embodiment of the preferred embodiments of the invention, the device comprises a closing stop 80 designed to secure third movable arc switching electrode 60 directly or indirectly at a distance D from first connecting electrode 40 when electric contacts 30, 31 are closed. This separation distance D of the electric contacts in the closed position acts as a spark-gap 22 electrically fitted in series with voltage-dependent resistor 21 of surge arrestor 2. As described in Patent application filed by the applicant under the number WO 04/042762 as an embodiment example, closing stop 80 comprises a conducting fixed pad presenting a surface forming a fixed electrode facing first connecting electrode 40 and an opposite surface forming a contact electrode on which third movable arc switching electrode 60 rests. According to another embodiment example as represented in FIG. 13, closing stop 80 comprises two parts 81, 82. A first part 80 made of insulating material is placed in contact with stationary contact 30. A second part 82 made of conducting material is placed in adjacent manner to first part 81 and is in contact with the movable contact when the two contacts 30, 31 are closed. The thickness of the insulating first part determines the distance D. In the event of a lightning strike, thermal disconnector 9 is disconnected from the circuit when an electric arc 100 is switched between first connecting electrode 40 and second connecting electrode 50.

According to another alternative embodiment, the disconnection device comprises resetting means 72. Resetting means 72 enable said third electrode to move from the position called switching position to the position called service position. In other words, closing of contacts 30, 31 can be brought about mechanically by means of resetting means 72 after permanent opening of said contacts. Resetting means 72 further enable action on actuating mechanism 7 to bring about permanent opening of electric contacts 30, 31. Resetting means 72 are no longer operational as soon as an AC or DC short-circuit current disconnector 9, 10 has caused definitive opening of electric contacts 30, 31 following a short-circuit fault.

The invention claimed is:

1. A voltage surge protection device comprising:

a disconnection device with electric contacts comprising:

a first connecting electrode electrically connected with a first connecting strip, a second connecting electrode electrically connected with a second connecting strip, a third movable arc switching electrode electrically connected to the second connecting strip, an actuating mechanism designed to move the third movable arc switching electrode to cause permanent opening of the electric contacts, a surge arrestor connected in series between the third movable arc switching electrode and the second connecting strip, comprising at least a first thermal disconnector for protection against AC or DC short-circuit currents connected in series with the surge arrestor between the third movable arc switching electrode and the second connecting strip, said thermal disconnector comprising at least one fuse element extending through a passage gap between a first and second conducting radial wall inside an insulating side wall of an arc extinguishing chamber, said arc extinguishing chamber comprising at least one conducting separator secured inside the insulating side wall to define two pressure relief volumes, said thermal disconnector being out of circuit when an electric arc is switched between the first connecting electrode and the second connecting electrode;

disconnection of said disconnector being performed when AC or DC short-circuit electric currents having a lower energy than a tripping energy threshold flow through the latter, said tripping energy threshold corresponding to the threshold above which electric surge currents of 10/350 or 8/20 type cause permanent opening of the electric contacts.

2. The voltage surge protection device according to claim 1, wherein the fuse element comprises a cross-section of substantially identical shape to the cross-section of the passage gap.

3. The voltage surge protection device according to claim 1, wherein the cross-section of said at least one fuse element in a plane perpendicular to a longitudinal centre line is of elongate shape so that the length of said cross-section is at least three times greater than the width.

4. The voltage surge protection device according to claim 1, wherein the thermal disconnector comprises two extinguishing chambers through which a fuse element respectively passes.

5. The voltage surge protection device according to claim 1, wherein said at least one conducting fuse element is composed of a conducting metal foil.

6. The voltage surge protection device according to claim 5, wherein the metal foil is secured by securing means on an insulating support forming an element of the insulating side wall.

7. The voltage surge protection device according to claim 1, wherein said at least one conducting fuse element is placed on the edges of said at least one separator.

8. The voltage surge protection device according to claim 1, wherein the side wall comprises holes for removal of the gases contained in the pressure relief volumes.

9. The voltage surge protection device according to claim 1, comprising a case having at least two flange-plates made from insulating material, said flange-plates constituting a part of the side wall of the thermal disconnector.

10. The voltage surge protection device according to claim 1, wherein the insulating side wall is composed of a gas-generating material.

11. The voltage surge protection device according to claim 1, wherein the surge arrestor is electrically connected in series with the disconnection device by at least one fuse link, drive means exerting a displacement force moving the surge arrestor in the event of melting of at least one fuse link, displacement of said arrestor acting directly on the actuating mechanism to move the third movable arc switching electrode and cause permanent opening of the contacts.

12. The voltage surge protection device according to claim 11, wherein the surge arrestor is electrically connected to the second connecting strip by a first fuse link that melts in the event of overheating of said surge arrestor.

13. The voltage surge protection device according to claim 11, wherein the surge arrestor is electrically connected to the second connecting strip by a second fuse link acting as thermal disconnector.

14. The voltage surge protection device according to claim 1, wherein a second electromagnetic disconnector protecting against AC or DC short-circuit currents is connected in series with the thermal disconnector and the surge arrestor between the third movable arc switching electrode and the second connecting strip.

15. The voltage surge protection device according to claim 14, wherein the electromagnetic disconnector comprises electromagnetic tripping means designed to act on the actuating mechanism to cause permanent opening of the electric contacts.

16. The voltage surge protection device according to claim 1, wherein a high-energy disconnector is connected in series between the first connecting electrode and the first connecting strip, the high-energy disconnector being calibrated to disconnect when electric currents having a greater energy than the tripping energy threshold flow through the latter.

17. The voltage surge protection device according to claim 16, wherein the high-energy disconnector comprises an arc extinguishing chamber being delineated by an insulating side wall extending between a first and second conducting radial wall, the arc extinguishing chamber comprising at least one conducting separator secured inside said chamber to define two pressure relief volumes and at least one conducting fuse element electrically connected between a first and second electrode, said at least one fuse element extending from the first to the second radial wall through a gap and being rigidly secured in the arc extinguishing chamber by securing means, the cross-section of said at least one fuse element being of elongate shape so that the length of said cross-section is at least three times greater than the width.

18. The voltage surge protection device according to claim 1, comprising a closing stop designed to secure the third movable arc switching electrode directly or indirectly at a separation distance from the first connecting electrode when the electric contacts are closed.

19. The voltage surge protection device according to claim 18, wherein the closing stop comprises two parts, a first part made of insulating material placed in contact with the stationary contact and a second part made of conducting material placed in adjacent manner to the first part and in contact with the movable contact when the two contacts are closed.

20. The voltage surge protection device according to claim 19, wherein the thickness of the first insulating part is equal to the separation distance.

* * * * *